United States Patent [19]

Tekkanat et al.

[11] Patent Number: 5,173,362
[45] Date of Patent: Dec. 22, 1992

[54] COMPOSITE SUBSTRATE FOR BIPOLAR ELECTRODES

[75] Inventors: Bora Tekkanat, Milwaukee; James J. Bolstad, Shorewood, both of Wis.

[73] Assignee: Globe-Union, Inc., Milwaukee, Wis.

[21] Appl. No.: 654,206

[22] Filed: Feb. 1, 1991

[51] Int. Cl.$^5$ .................. B32B 5/16; B32B 27/20; D21H 11/00
[52] U.S. Cl. .................. 428/283; 428/244; 428/273; 428/290; 162/138; 162/145; 162/169; 162/181.9; 429/198; 429/199; 429/210
[58] Field of Search ............ 428/283, 290; 429/198, 429/199, 210; 162/138, 145, 156, 164.1, 168.1, 169, 181.9; 204/291; 361/433

[56] References Cited

U.S. PATENT DOCUMENTS

| | | | |
|---|---|---|---|
| 3,149,023 | 9/1964 | Bodendorf et al. | 162/138 |
| 3,367,851 | 2/1968 | Filreis et al. | 162/138 |
| 3,642,538 | 1/1972 | Zito, Jr. | 136/30 |
| 4,105,829 | 8/1978 | Venero | 429/198 |
| 4,124,747 | 11/1978 | Murer et al. | 252/511 |
| 4,169,816 | 10/1979 | Tsien | 252/511 |
| 4,294,893 | 10/1981 | Iemmi et al. | 429/217 |
| 4,482,614 | 11/1984 | Zito, Jr. | 429/101 |
| 4,521,359 | 6/1985 | Tsien | 264/171 |
| 4,877,679 | 10/1989 | Leatherman et al. | 428/224 |

Primary Examiner—George F. Lesmes
Assistant Examiner—Kathryne E. Shelborne
Attorney, Agent, or Firm—Foley & Lardner

[57] ABSTRACT

Substrates for electrode systems, particularly those to be used for bipolar electrodes in zinc-bromine batteries, are disclosed. The substrates preferably include carbon-black as a conductive filler in a polymeric matrix, with reinforcing materials such as glass fibers. Warpage of the zinc-bromine electrodes which was experienced in the prior art and which was believed to be caused by physical expansion of the electrodes due to bromine absorption by the carbon-black, is substantially eliminated when new substrate fabrication techniques are employed. In the pesent invention, substrates are prepared using a lamination process known as glass mat reinforced thermoplastics technology or, in an alternate embodiment, the substrate is made using a slurry process.

10 Claims, 3 Drawing Sheets

COMPOSITE SUBSTRATE FOR BIPOLAR ELECTRODES

The Government of the United States of America has rights in this invention pursuant to Contract No. DE-AC04-88AL54304 awarded by the U.S. Department of Energy.

BACKGROUND OF THE INVENTION

1. Field of the Invention

The present invention relates generally to the art of substrates for electrode structures and more specifically to substrates useful in zinc-bromine batteries. Still more specifically, the invention relates to the preparation of such substrates using novel fabrication techniques, including glass mat reinforcement or a slurry process similar to that employed in the paper industry.

2. Description of the Prior Art

Zinc-bromine batteries have been designed for use in electric vehicles, for bulk energy storage and for other battery applications which can take full advantage of the high energy density and low manufacturing costs offered by the zinc-bromine system. Because the production cost of battery parts is critical, ease in manufacturing is highly desirable. Extensive experimentation has focused on developing a high performance, low cost bipolar electrode system for use in zinc-bromine batteries.

Zinc-bromine batteries are described in Zito U.S. Pat. No 4,482,614 issued Nov. 13, 1984 for "Zinc-Bromine Battery With Long Term Stability". In this patent, a number of electrode substrate materials are described including those made from thermoplastic polymers such as polyvinylidene fluoride, acrylonitrile-butadiene-styrene or polyvinylchloride. The basic structure of zinc-bromine batteries is also shown in such patent and in U.S. Pat. No. 4,169,816 issued Oct. 2, 1979 to Tsien for "Electrically Conductive Polyolefin Compositions". Other conductive electrode compositions are shown in U.S. Pat. No. 4,294,893 issued Oct. 13, 1981 to Iemmi, et al. for "Graphite-Resin Composite Electrode Structure, And A Process For Its Manufacture" and U.S. Pat. No. 4,124,747 issued Nov. 7, 1978 to Murer, et al. for "Conductive Polyolefin Sheet Element". Further examples of metal halide battery structures include those described in U.S. Pat. No. 3,642,538 issued Feb. 15, 1972 to Zito for "Metal Halide Battery" and U.S. Pat. No. 4,105,829 issued Aug. 8, 1978 to Venero for "Metal Halogen Batteries And Method of Operating Same".

By following a typical discharge-charge cycle, the operation of zinc-bromine batteries can be easily understood. During charging, zinc is plated at the negative electrode and bromine is evolved from the positive electrode. Bromine reacts with a soluble complexing agents provided in the system to form a second liquid phase. The bromine-rich phase is then removed from the stack of electrodes and separated by gravity in a catholytic storage region. An emulsion of the bromine-rich phase and the aqueous bromine phase is fed back to the stack. The electrical reactions involved during charge of the zinc-bromine battery system can be shown as follows:

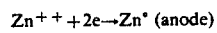

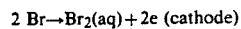

During discharge the reverse reactions occur, forming the original zinc-bromide solution and liberating the energy absorbed during charging The separator prevents direct mixing of anolyte and catholyte.

One of the key components in any zinc-bromine battery is the bipolar electrode substrate. The optimal substrate for use in zinc-bromine systems should have the following combination of properties: low resistivity, ease of manufacture at low cost, flexibility, strength, chemical stability and minimal expansion during use.

A common mode of failure for batteries using the prior art has been expansion of the electrode structure which causes warpage and leads to eventual system failure. As the brominated electrolyte interfaces with the electrode, bromine absorbs onto the surface of carbon fillers used in prior systems, and the polymer matrix relaxes. Due to this absorption and relaxation, the overall size of the electrode increases. In most systems, the electrode is fixed in place at the periphery, and the increase in size can only be accommodated by warpage. Thus, it is essential that a bipolar electrode substrate exhibit the desired physical properties listed previously, yet not be subject to warpage.

Recent attempts at making zinc-bromine batteries have focused on electrode systems which are flat and thin (about 0 015 to 0.120 inches) with the size and shape depending on the application and the specific design requirements. The electrode should provide a resistivity of less than 5 $\Omega$-cm, adequate strength, flexibility and chemical stability for the life of the battery.

Prior conductive plastic composites have included compositions consisting of ethylene/propylene copolymer, Cabosil ® (or fumed silica), glass fiber, pitch fiber and carbon-black. The purpose of the glass and pitch fiber was to increase flexural strength, and the Cabosil ® was provided to facilitate better mixability during compounding operations. Carbon-black was loaded to approximately 58 v/o based on the polymer. In some systems, non-conductive top, bottom and side borders have been used for mounting and manifolding of the electrodes. Such electrodes and insulating plastic frames were prepared using a co-extrusion process described in U.S. Pat. No. 4,521,359 issued to Hsue C. Tsien on June 4, 1985 and entitled "Method of Coextruding Plastics to Form a Composite Sheet".

Polymer systems using carbon-black as a filler have received special attention because they combine the inherent properties of polymers (such as toughness, flexibility and chemical resistance) with a relatively high conductivity. They are also light in weight and can be mass produced using inexpensive processes such as extrusion and injection molding.

Chemical stability has been the most difficult problem to overcome with such systems. Tensile strength declined significantly upon exposure to bromine, and the average molecular weight of the polymer systems also decreased as the length of exposure increased. It was believed, based on these tests, that bromine was being absorbed onto the substrate over time, causing unacceptable expansion and warpage, along with deterioration of the electrodes' physical properties. See FIG. 1 of the drawings. Bromination, unlike chlorination, is extremely selective to the chemistry of the polymer matrix used, and the tertiary hydrogens of polypropylene systems react approximately twenty thousand (20,000)

times faster with bromine than the secondary hydrogens in polyethylene.

Improved substrates for electrode systems, such as those involved in the bipolar electrodes of zinc-bromine batteries, would represent a significant advance in the art.

SUMMARY OF THE INVENTION

A feature of the present invention is a substrate material for use in electrode systems, e.g. of the type used in zinc-bromine batteries, which overcomes the aforementioned problems with prior art systems. A principal feature of the invention is reduced bromine absorption and a resultant reduction in dimensional changes in the substrate, with a consequent reduction in warpage. Features of the invention include optimization in the selection of the polymer material and the carbon-black material used in the substrate, and the use of fabrication techniques which have heretofore received relatively little attention. A principal feature of the invention is the recognition that two fabrication techniques new to this art can employ long or continuous fibers and, therefore, provide substrate structures having greatly improved properties when compared to those made by extrusion or injection molding. More specifically, the features are accomplished in systems which employ glass mat reinforced thermoplastic resin technology or slurry processes similar to those employed in paper making. While certain materials which have been used in the prior art are employed in such systems, the fabrication techniques, as will be demonstrated, result in very substantial improvement in the properties of the completed electrodes. The specifics of the manufacturing techniques will be set forth in connection with the description of the preferred embodiment.

Other features and advantages of the invention will become apparent to those skilled in the art after reading and understanding the present specification. These features and advantages are deemed to fall within the scope of the present invention if they fall within the scope of the claims which follow

DETAILED DESCRIPTION OF THE PREFERRED EMBODIMENT

Figure 1:
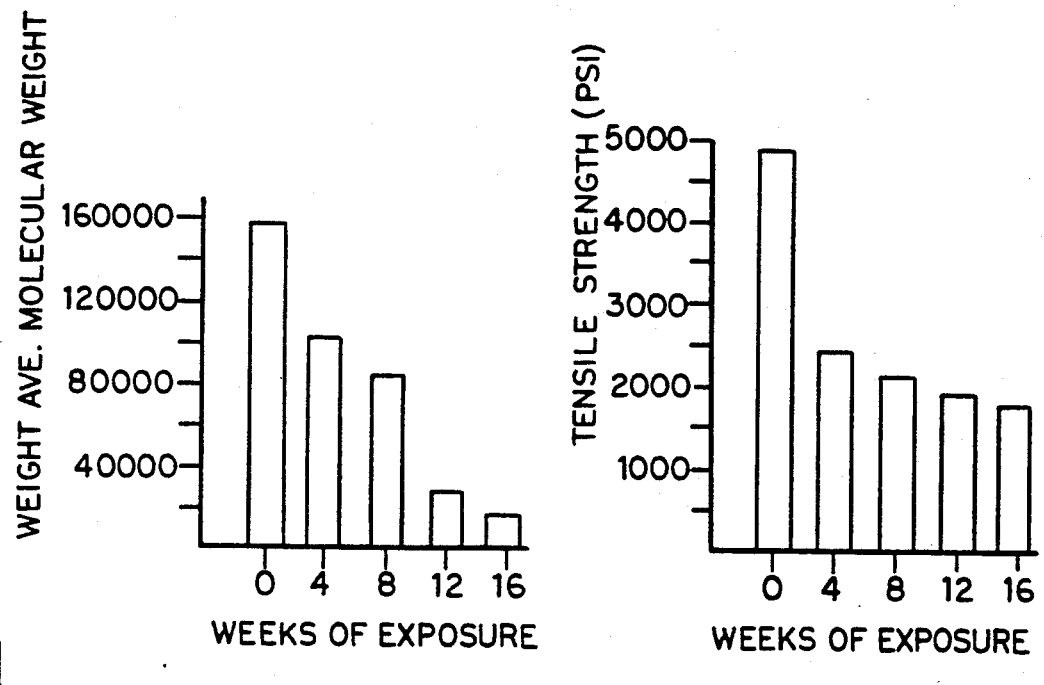
FIG. 1 is a pair of graphs showing molecular weight and tensile strength degradation of polypropylene based electrodes when exposed to bromine.

Before proceeding to a description of the techniques employed to fabricate the preferred substrates of the present invention, several comments will be made about the materials employed and the analytical tests used in connection with the present invention. The principal polymeric materials used in the invention is a polypropylene (PP) copolymer (Pro-FaxSB-786) sold by Himont U.S.A. Inc., a high density polyethylene (HDPE) available from Union Carbide (Bakelite DMDA 6147), a polyvinylidine fluoride (PVDF) (Solef 1010) available from Soltex, a carbon-black (Ketjenblack EC) available from Akzo Chemie America, a glass mat from PPG Industries, Inc. and glass fibers available from Owens Corning. The HDPE material proved to be much more resistive to bromination than the polypropylene, and in basic structures, it was determined that the HDPE mixed with 20% glass fibers increased only 2% in weight when exposed to bromine as compared to the same composite made with polypropylene which increased over 9% by weight. Obviously, the electrical conductivity of the polymer/glass fiber materials alone is unacceptable for use in electrode applications, and in order to lower the resistivity, carbon-black is used. Carbon-black particles generally consist of hollow spheres which interconnect, forming convoluted chains through a polymer matrix. These chains have high surface areas which greatly increase conductivity, while at the same time, the chains create the absorption problems previously discussed. Various types of carbon-black were evaluated in an attempt to determine which provided the most advantageous conductivity properties, while at the same time, minimizing deterioration of other properties required for the system. Typical analytical properties of the carbon-blacks tested are shown in Table 1.

TABLE 1

| CARBON BLACK TYPE | Nitrogen Surface Area ($m^2/g$) | Dibutyl Phthalate (DBP Absorption) (cc/100 g) | Volatile Content (%) |
| --- | --- | --- | --- |
| Vulcan ® XC-72 | 254 | 178 | 1.5 |
| Black Pearls ® - 2000 | 1475 | 330 | 2.0 |
| Ketjenblack ® EC 300J | 800 | 365 | 0.5 |

Carbon-black is typically a pyrolysis product of a hydrocarbon, such as oil, subjected to very high temperatures. It may be partially graphitic with an onion-skin surface, and the size of the individual spheres may vary from about 140 to 3,000 angstroms. Hollow spheres tend to fuse together and aggregate, even after compounding with polymers Carbon-black composites offer an upper limit of conductivity on the order of 10 $\Omega^{-1}-cm^{-1}$ with a considerably lower degree of loading by weight when compared to other conductive fillers.

The electrical conductivity of carbon-black does not increase linearly with the amount of carbon-black added. Highest conductivity is obtained when the carbon-black forms a continuous network on which charges can travel. Compounding also has a profound influence. Over-processing and mechanical deformation of the final product may result in an appreciable loss of conductivity.

In the experimental work relating to the present invention, the three carbon-blacks listed in Table 1 were formulated and tested with regard to conductivity, physical properties, processability and cost. The Vulcan ® XC-72, while very economical, required such a high loading level for optimum conductivity that the physical properties of the electrodes suffered. Black Pearls ®-2000 eliminated the problem of excessive loading, but processing difficulties were encountered. The Ketjenblack ® EC offered the best combination of properties for the electrode applications of the present invention. It was an effective filler with a high conductivity value for the weight percent carbon used, and was relatively more forgiving toward over-processing.

While the addition of carbon-black to the polymer is necessary to obtain the required conductivity level, it readily absorbs bromine and therefore causes the electrode to expand more extensively. Addition of carbon-black to HDPE causes the material to gain over twenty percent of its weight after exposure to bromine vapor for 24 hours at room temperature, ten (10) times the weight gain exhibited by the resin before the addition of carbon-black The gain in weight is indicative of extensive bromine absorption, due to the presence of carbon-black, which in turn causes greater warpage of the electrode.

We have determined that the fluorinated polymers give polymeric composites with greatly increased chemical stability. PVDF was used as a matrix material to obtain a base level of limited expansion, to which the other matrix materials could be compared When exposed to bromine vapor for 24 hours, a PVDF composite containing 18 w/o carbon-black expanded only 0.18%, approximately one tenth the amount of the HDPE composite. Resistivity values of the PVDF composite were found to be approximately the same (1.23 Ωcm) using the 4-point technique. The only significant disadvantage of PVDF over HDPE is its higher cost.

The original electrodes produced during background work on this invention were made using a continuous extrusion process and consisted of a HDPE/carbon-black/glass fiber mixture. The electrodes were cut into a rectangular shape as the battery design dictated The rectangularity of the electrodes, combined with the fiber orientation imparted by the extrusion process gave an even expansion along both sides of the electrodes Through the extrusion process, the glass fibers became oriented significantly in the extrusion direction. This orientation caused the electrodes, when exposed to bromine, to expand more extensively in perpendicular to the extrusion direction. Because of the batteries' rectangular shape, more extensive expansion in the perpendicular direction (shorter side) allowed the battery to maintain its overall initial shape by expanding an equal amount in both directions, and thus partially limited the failures.

To increase the efficiency of the zinc-bromine system, the design of the battery was changed. Due to the change in design, the bipolar electrode was square and unequal amounts of expansion in the length and width directions were no longer desirable. To eliminate growth which favored the direction perpendicular to extrusion, a random orientation of fibers was deemed to be necessary. Some extrusion trials were done using milled glass fibers (as opposed to chopped fibers) to obtain less biased preferential fiber orientation. Milled fibers, due to their shorter length, allowed for more random orientation. However, they also allowed for greater warpage in all directions than did chopped fibers Other attempts were made to reduce expansion problems by using injection molding. However, it was quite difficult to mold these large and flat, yet thin electrodes. Injection molding operation did not permit the control of fiber orientation in the part either and caused excessive fiber breakage Therefore, further changes in the fabrication technique were found to be necessary to obtain better mechanical properties than could be achieved with injection molding or extrusion processes using short-fiber reinforced composites.

Compounding of the various polymers with carbon-blacks used in the present invention was accomplished in a single screw extruder Substrate compositions were confirmed by thermogravimetric analysis after compounding using a Du Pont 951 TGA machine. Approximately 50 mg of the samples were heated up to 600° C. in an inert atmosphere at a constant heating rate of 10° C./minute, while weight changes in the samples were recorded.

Tensile strengths of composite substrates were determined in accordance with ASTM D-638 using an Isotron. A Du Pont 910 differential scanning calorimetry with 1090 controller was used to monitor the effects of bromine on the thermal characteristics of the polymer matrix. A sample of three to five milligrams of the substrate material was heated from 25° C. to 200° C. with a heating rate of 10° C./minute and maintained at 200° C. for five minutes. The sample was then cooled to room temperature and reheated to 200° C. at the same rate. Thermograms of the second heating cycle revealed the most information about bromine attack on the polymers.

The resistivities of the substrates were measured using the four-point probe method in which samples taken from the composite measuring three inches long and one inch wide were used. Four platinum wires were bonded parallel to each other, approximately one inch apart along the length of the samples using a water soluble conductive adhesive Current ranging from 1 to 5 milliamps was applied across the sample from the outside probes and the voltage drop due to the resistivity of the samples was measured from the two inside probes. Resistance was calculated using Ohm's law. Then the resistivity was calculated by the following relation:

$$\rho = R(A/L)$$

where the cross-sectional area of the sample is A and the distance between the two inside probes is L.

The expansion of the electrode materials was measured by exposing the samples either to bromine vapor or battery electrolyte. Measurement of expansion by exposure to bromine vapor takes a shorter amount of time, usually a few days or less, compared to the two to three week period required for testing an aqueous battery electrolyte (3 molar $ZnBr_2$ and 2 molar $Br_2$). Samples from electrode materials were cut to a preselected size (approximately 5 by 10 cm), then weighed, and their dimensions measured accurately. After being placed in a sealed jar containing bromine or electrolyte, the samples were removed following the test period, weighed and dimensions again measured as quickly as possible. The weight gain and percent expansion were then calculated.

The thermograms resulting from the use of polypropylene and high density polyethylene compositions showed dramatically the improvement of HDPE. A significant drop in the melting point of the polypropylene (from 163° C. to 147° C.) was noted from the thermograms, while the change was much less noticeable in the HDPE systems. Therefore, HDPE proved to be much more resistive to bromination than polypropylene. While PVDF is considered to be an especially preferred material (as previously mentioned), if cost constraints are taken into consideration, HDPE is our matrix material of choice.

Figure 2:
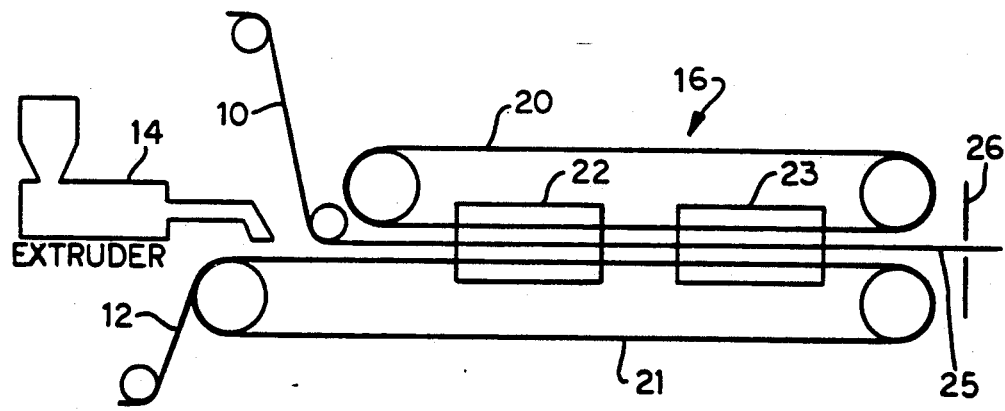
FIG. 2 is a schematic view of a glass mat reinforced thermoplastic sheet making process.

In an attempt to produce electrodes with better physical properties than was possible through injection molding, two thermoplastic composite sheet making processes which are novel to the battery art were utilized. The first is known as glass-reinforced thermoplastic sheet, or stampable thermoplastic sheet technology. This technology utilizes a continuous thermal forming press which is described in the September 1980 issue of "Plastics Technology" magazine in an article entitled "New Continuous Sheet Process Uses Double-Belt Conveyor/Press", see pages 27, 29 and 31. A copy of the article is submitted with this specification. The process depicted in FIG. 2 of the drawings of this specification and which is discussed in much greater detail in the article is a continuous sheet manufacturing process and employs such a continuous thermal forming press.

As shown in the schematic figure, a pair of mats 10 and 12 (which can be glass mats, fabrics, webs, screens, or other types of sheets made from fiber) are combined in a desired ratio with a resin matrix compounded with carbon-black which is provided from an extruder 14. A single web could also be employed to produce substrates using this technique. The combined materials are then sent through a temperature controlled laminator 16 to form the composite sheet in the desired thickness, a feature being the use of a double steel belt press 20, 21 that conveys the feed stock through a controlled time-temperature-pressure cycle (including heating section 22 and cooling sections 23) and feeds out a continuous sheet of finished product 25 at the other end that can either be cut to length (26), slit to width, rolled onto take-up coils, or fed continuously into a subsequent process, such as stamping. The continuous fibers in the mat, while being completely dispersed in the composite, make up an intricate three-dimensional network and provide essentially isotropic properties. The process can handle thicknesses ranging between 0.010–1.0 inch, and glass contents can range from 10 to 70 percent. For the bipolar electrode applications with which this invention is primarily concerned, the extrudate is loaded with carbon-black to provide a conductive sheet.

The time-temperature-pressure cycle will vary depending on the types of materials being processed, the material compositions, and the thickness of the desired sheet. Line speeds can range up to 60-90 ft./min , with residence times typically being less than 10 minutes.

Water (e.g., at 75°–80° F.) is usually used as a cooling fluid, and the heating section can be held at any suitable temperature above the melting point of the resin (e.g., 600° F. or more). Pressure will again depend on the aforementioned variables, but typically 15-100 psi or greater pressure is applied.

While a continuous process is preferred and is illustrated, a batch operation could also be employed to prepare our novel substrates, using any type of heating press. The important point is the use of a mat which will provide greater dimensional stability when compared to extrusion or injection molding.

Figure 3:
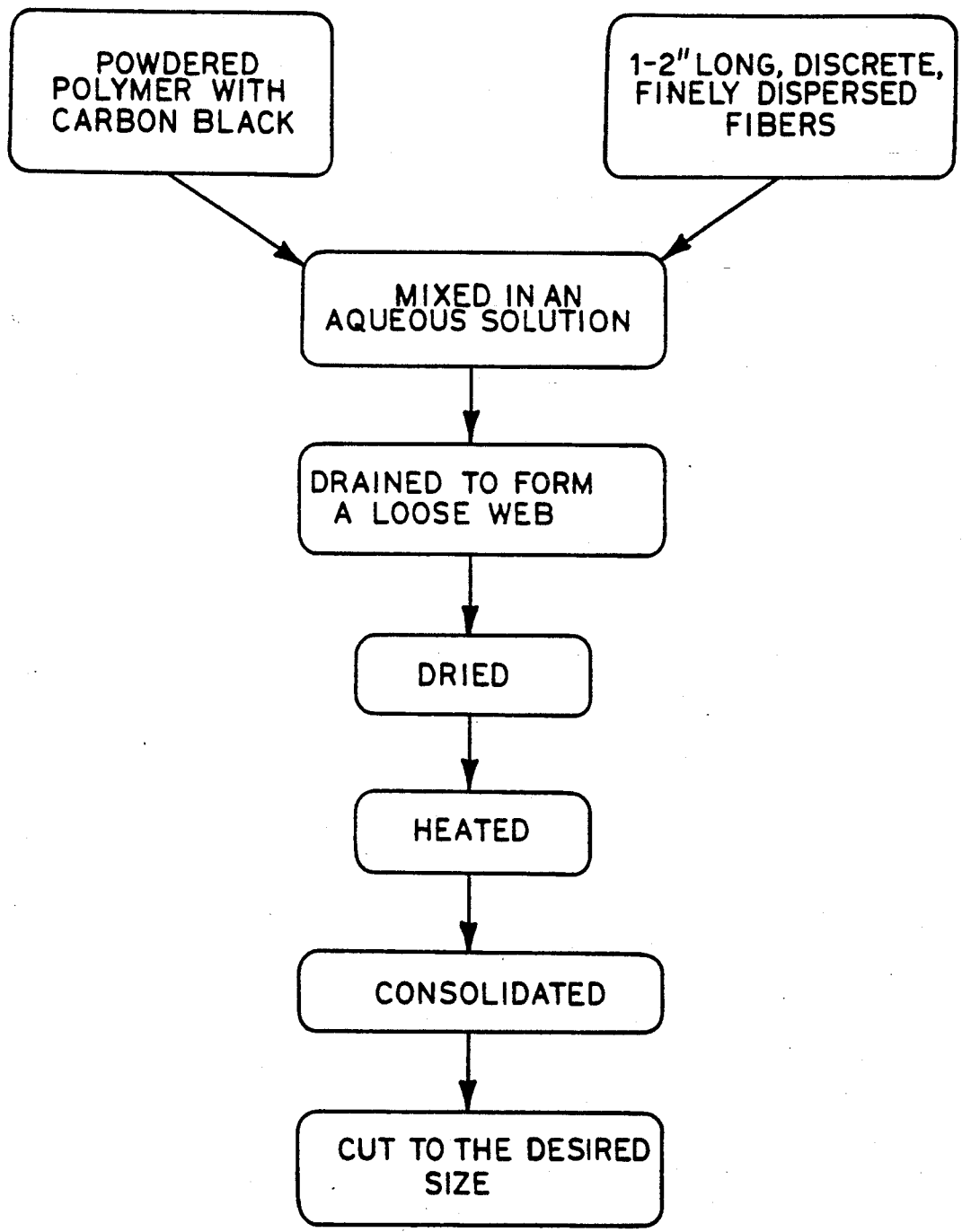
FIG. 3 is a flow chart illustrating an alternate fabrication technique according to the present invention.

Another technique which has been found preferable to extrusion or injection molding is a slurry process similar to that used in paper making. The sheet produced includes long (1-2 inch), discrete, finely dispersed fibers. The process is depicted in FIG. 3 where a powdered, carbon-black filled resin is mixed with 1 inch-2 inch long discrete fibers in an aqueous solution. The fibers are originally in bundles, but through gentle mixing are thoroughly dispersed throughout the solution forming a resin equally surrounded, distributed glass network in exactly the desired ratio. After mixing, the solution is drained to form a loose web which is then dried. Several layers of webs are then stacked to obtain the desired thickness and the stack is then heated, consolidated and cut into a desired dimension. For substrates having a final thickness in the range of from about 0.010 in. to much larger thicknesses, the heating would be carried out at any temperature above the melting point of the resin (e.g., 600° F. or more) using consolidation pressures for several individual loose webs of from 15-100 psi or more.

The electrodes produced by the GMRT method exhibited substantially greater dimensional stability than electrodes produced by injection molding. The glass mat formed a continuous network, giving the electrode excellent tensile strength. The random orientation of the fibers eliminated the possibility of uneven expansion or warpage in the electrodes.

The electrodes produced with glass mats containing various amounts of glass fiber and 18 w/o carbon black were tested by exposing them to aqueous electrolytes for a period of two weeks. The electrode became more stable and exhibited less expansion as the level of glass fibers was increased, as shown in Table 2.

TABLE 2

| HDPE Matrix Glass Fiber Content (w/o) | % Expansion in Electrolyte for 2 weeks |
|---|---|
| 0 | 1.13 |
| 15 | 0.84 |
| 20 | 0.48 |
| 25 | 0.41 |
| 30 | 0.35 |
| 35 | 0.32 |
| 40 | 0.27 |
| 45 | 0.24 |

GMRT electrodes were also compared to similar electrodes produced by injection molding. Upon exposure to brominated electrolyte, the GMRT electrodes exhibited much greater dimensional stability. Battery systems containing GMRT electrodes are anticipated to exhibit longer lifetimes and be less prone to failure by warpage. Table 3 shows the results of comparative testing which supports this conclusion.

TABLE 3

| Components (w/o) | | % Expansion | |
|---|---|---|---|
| Glass Fiber | Carbon Black | Injection Molded | Glass Mat Reinforced |
| 20 | 18 | 0.95 | 0.48 |
| 25 | 18 | 0.75 | 0.41 |
| 30 | 18 | 0.61 | 0.35 |

Tests were performed on substrates by exposing them to liquid bromine for an extensive period of time. After five days exposure to liquid bromine, the substrates had expanded 0.2% in length and width. After this point expansion ceased After 45 days, the substrate was still only 0.2% larger than it had been at the start of the In order to obtain an accurate comparison of the different substrates produced through different processing techniques, a liquid bromine exposure test was carried out on nine samples depicted in FIG. 4. The key to the FIGURE terminology is provided at the right of the FIGURE, and the following Table 4 identifies samples 1-9 and their compositions.

TABLE 4

| SUBSTRATE | COMPOSITION | PROCESSING METHOD EMPLOYED |
| --- | --- | --- |
| #1 | HDPE only (no glass, no carbon black) | Compression molded |
| #2 | HDPE + 18 w/o c.b., no glass | Compression molded |
| #3 | HDPE + 18 w/o c.b. + 45 w/o fiber glass | Extruded |
| #4 | HDPE + 18 w/o c.b. + 45 w/o fiber glass | Injection molded |
| #5 | PVDF only (no glass, no c.b.) | Compression molded |
| #6 | PVDF + 18 w/o c.b., no glass fibers | Compression molded |
| #7 | PP + 18 w/o c.b. + 45 w/o f.g. | Extruded |
| #8 | HDPE + 18 w/o c.b. + 45 w/o glass mat | GMRT |
| #9 | HDPE + 18 w/o c.b. + 45 w/o long fibers | Slurry process |

Figure 4:
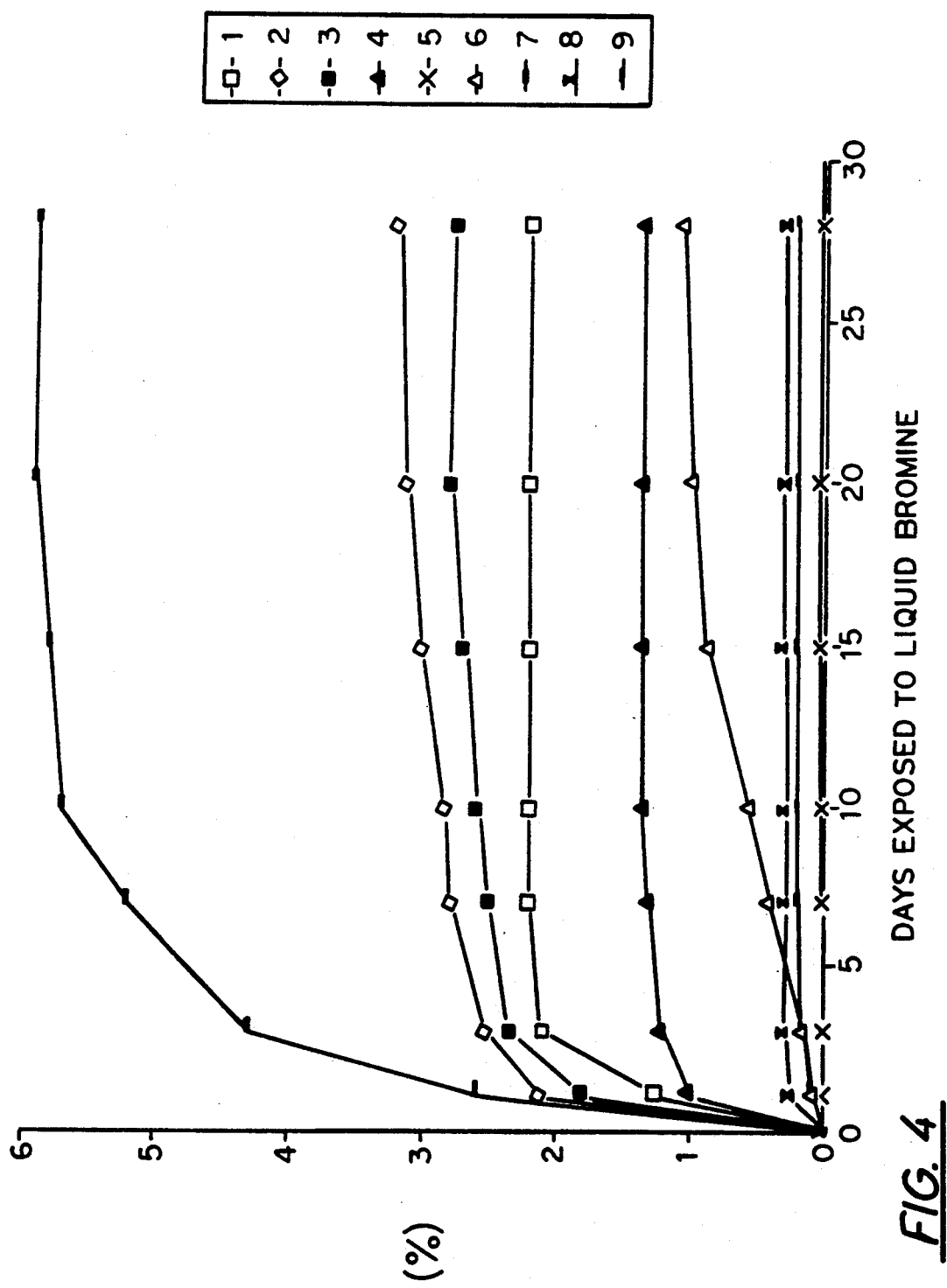
FIG. 4 is a graph illustrating the percent dimensional change, as measured against days of exposure to liquid bromine, for eight polymeric systems studied by the present inventors, including those made according to the present invention.

As seen in FIG. 4 the composite substrates prepared by both the slurry and GMRT techniques were substantially lower in expansion than any of the samples produced by extrusion or injection molding techniques.

While the present invention has been described in connection with preferred embodiments described and illustrated in the FIGURES and Tables above, the invention is not to be limited by such descriptions, but is to be limited soley by the scope of the claims which follow.

What is claimed is:

1. A substrate for a bipolar battery comprising a thermoplastic resin, a glass fiber filler, and a conductive carbon black powder prepared by a process including the following steps:
   compounding a mixture of the resin and the conductive powder;
   preparing at least one glass fiber mat of the fiber filler;
   conveying the mat along a straight path;
   introducing molten compound resin and powder onto said mat;
   pressing the mat to impregnate same with molten resin containing conductive powder; and
   cooling the impregnated mat to form a sheet substrate and wherein the substrate includes about 10 to 70 weight percent glass fibers and about 5 to 40 wt. % carbon black, the balance being resin.

2. The substrate of claim 1 wherein the process further comprises the step of cutting the sheet to a desired size.

3. The substrate of claim 1 wherein said thermoplastic resin is selected from the group consisting of polyethylene, polypropylene and polyvinylidene fluroide.

4. The substrate of claim 1 wherein the mat is prepared by the steps of providing continuous strands of glass fiber in a generally parallel, two dimensional pattern and then adding a third dimension to the glass strands prior to the step of introducing the resin and powder.

5. The substrate of claim 1 wherein the substrate comprises high density polyetylene as the resin.

6. A substrate for a bipolar battery, including a thermoplastic resin, a glass fiber filler and a conductive powder prepared by a process including the following steps:
   compounding a mixture of the resin and the conductive carbon black powder;
   forming a powder from the mixture;
   mixing the powder with discrete glass fiber filler in an aqueous solution;
   draining the water from the solution while allowing the resin and discrete filler fibers to form a sheet-like, random fiber web;
   drying the web;
   heating the web above the melting point of the thermoplastic resin; and
   pressing the heated web to consolidate same; and
   cooling the substrate so produced and wherein the substrate includes about 10 to 70 weight percent of the fiber filler and about 5 to 40 wt. % carbon black, the balance being resin.

7. The substrate of claim 6 wherein said process comprises the further step of stacking at least two of the webs to obtain additional thickness, prior to the heating step.

8. The substrate of claim 6 wherein said thermoplastic resin is selected from the group consisting of polyethylene, polypropylene and polyvinylidene fluoride.

9. The substrate of claim 6 wherein said glass fibers are about 1 to 2 inches long.

10. The substrate of claim 6 wherein the substrate comprises high density polyethylene as the resin and carbon-black as the conductive powder.

* * * * *